US010468858B2

(12) United States Patent
Holzschuh et al.

(10) Patent No.: US 10,468,858 B2
(45) Date of Patent: Nov. 5, 2019

(54) SUPPLY CIRCUIT FOR A CORONA IGNITION DEVICE

(71) Applicant: BorgWarner Ludwigsburg GmbH, Ludwigsburg (DE)

(72) Inventors: Thomas Holzschuh, Roth (DE); Hans-Peter Etzkorn, Bruchsal (DE); Peter Schaefer, Knittlingen (DE)

(73) Assignee: BORGWARNER LUDWIGSBURG GMBH, Ludwigsburg (DE)

( * ) Notice: Subject to any disclaimer, the term of this patent is extended or adjusted under 35 U.S.C. 154(b) by 257 days.

(21) Appl. No.: 15/637,704

(22) Filed: Jun. 29, 2017

(65) Prior Publication Data

US 2018/0006435 A1  Jan. 4, 2018

(30) Foreign Application Priority Data

Jul. 1, 2016  (DE) .......................... 10 2016 112 117

(51) Int. Cl.
*F23Q 3/00* (2006.01)
*H01T 13/44* (2006.01)
(Continued)

(52) U.S. Cl.
CPC ................ *H01T 13/44* (2013.01); *F02P 3/01* (2013.01); *F02P 23/04* (2013.01); *F23Q 3/006* (2013.01);
(Continued)

(58) Field of Classification Search
None
See application file for complete search history.

(56) References Cited

U.S. PATENT DOCUMENTS 5,105,351 A * 4/1992 Harada .................... H05G 1/20
                                                     363/37
5,309,344 A * 5/1994 Smith ............... H02M 3/33576
                                                     363/131

(Continued)

FOREIGN PATENT DOCUMENTS

AT          507 748 A1    7/2010
DE     199 61 541 A1    7/2001
(Continued)

*Primary Examiner* — Stephen W Jackson
(74) *Attorney, Agent, or Firm* — Bose McKinney & Evans LLP

(57) ABSTRACT

Described is a supply circuit for a corona ignition device, with an input for connection to a direct voltage source, a first converter, a second converter, and an output for connecting a load. The two converters each generate an output voltage, which is provided on its secondary side and exceeds the input voltage. The two converters each contain a transformer that galvanically separates the primary side of the converter from its secondary side. At least one transistor switch is arranged between the input and primary side of the two converters for pulse width-modulation of the input voltage. The primary side of the second converter is connected in parallel with the primary side of the first converter, the secondary side of the second converter is connected in series with the secondary side of the first converter, the secondary sides of the two converters are each bridged in this series connection by at least one diode, so that an output voltage can be provided at the output of the supply circuit even given a failure of one of the two converters.

10 Claims, 3 Drawing Sheets

(51) Int. Cl.
- *F02P 3/01* (2006.01)
- *F02P 23/04* (2006.01)
- *H01F 38/12* (2006.01)
- *H01T 13/20* (2006.01)
- *H01T 19/00* (2006.01)

(52) U.S. Cl.
CPC ............ *H01F 38/12* (2013.01); *H01T 13/20* (2013.01); *H01T 19/00* (2013.01)

(56) References Cited

U.S. PATENT DOCUMENTS

| | | | |
|---|---|---|---|
| 8,724,345 B2* | 5/2014 | Kyono | H02M 3/337 363/16 |
| 9,369,051 B2* | 6/2016 | Cohen | H02M 3/33546 |
| 2003/0058660 A1 | 3/2003 | Biebach | |
| 2004/0129241 A1 | 7/2004 | Freen | |
| 2010/0147239 A1 | 6/2010 | Lu et al. | |
| 2012/0320637 A1* | 12/2012 | Kyono | H02M 3/337 363/21.02 |
| 2014/0232282 A1* | 8/2014 | Rooijackers | H02M 3/33523 315/200 R |
| 2016/0013623 A1 | 1/2016 | Zheng et al. | |
| 2016/0319797 A1 | 11/2016 | Reimann | |

FOREIGN PATENT DOCUMENTS

| | | |
|---|---|---|
| DE | 10 2007 009 105 B4 | 4/2009 |
| DE | 10 2013 015 063 B3 | 3/2015 |
| WO | WO 2014/149661 A1 | 9/2014 |

\* cited by examiner

SUPPLY CIRCUIT FOR A CORONA IGNITION DEVICE

RELATED APPLICATIONS

This application claims priority to DE 10 2016 112 117.7, filed Jul. 1, 2016, the entire disclosure of which is hereby incorporated herein by reference in its entirety.

BACKGROUND

The invention relates to a supply circuit for a corona ignition device, as well as to a corona ignition system with a corona ignition device and such a supply circuit.

U.S. Publication No. 2004/0129241 A1 describes the ignition of fuel in a combustion chamber of an internal combustion engine by means of a corona discharge generated in the combustion chamber. Such a corona ignition device comprises a center electrode held by an insulator body, which forms a capacitance together with an outer conductor enveloping the insulator body or the walls of the combustion chamber which are at mass potential and provide the counter-electrode. The insulator, which surrounds the center electrode, and the combustion chamber with its contents act as the dielectric of this capacitance. Depending on the stroke of the piston, the combustion chamber contains air or a fuel-air mixture or an exhaust gas.

This capacitance is part of an electrical resonant circuit, which is excited with a high-frequency alternating voltage of 10 kV or more. This alternating voltage is generated by a high-frequency generator, e.g., by a transformer with center tap.

As a rule, most vehicles have an on-board electrical system voltage of only 12 V. Theoretically, it is possible to use such an on-board electrical system voltage as input voltage for the high-frequency generator of a corona ignition system. However, this is very expensive. This is why corona ignition systems in vehicles usually contain a supply circuit that generates a supply voltage from the on-board electrical system voltage of about 100 V to 400 V for the high-voltage generator.

SUMMARY

This disclosure provides a way to safely and reliably generate a supply voltage for a corona ignition system from an on-board electrical system voltage.

The use of converters with transformers that exhibit two magnetically coupled coils enables a galvanic separation of the primary side of the converter from the secondary side. In simple converter types, for example charge pumps or upwards converters, such a galvanic separation is lacking, so that defects on the secondary side, e.g., a short circuit, can always also penetrate through to the primary side and cause major damage. Galvanic separation makes it possible to limit defects on the secondary side, e.g., a short circuit, to the secondary side.

The primary side is usually supplied with the on-board electrical system voltage of the vehicle, e.g., in automobiles with a rated voltage of 12 V, and in trucks with a rated voltage of 24 V. The voltage on the secondary side is significantly higher, for example measuring 100 V to 500 V. When defects of the secondary side remain confined to the secondary side, the amperages are thus significantly lower than for defects that (also) affect the primary side. Therefore, this disclosure significantly reduces the danger of greater damages.

In a supply circuit according to this disclosure, the converters are used as power sources for a connected load, typically a high-frequency generator. The supply security of this load, and hence the functionality of the corona ignition system, are significantly increased by having the supply circuit contain two converters, whose primary sides are parallel, and whose secondary sides are connected in series. The secondary side of each of the two converters is here connected in parallel with a diode; the secondary sides connected in series are thus each bridged by at least one diode. If one of the two converters fails, the other converter can still maintain an emergency supply, so that the corona ignition system does not fail entirely, but rather can sustain an ignition at reduced engine speeds. This type of emergency operation is an important advantage, since it allows a vehicle that would otherwise have to be towed to drive into a workshop on its own.

An advantageous refinement of this disclosure provides that the converters be resonant converters. Resonant converters are especially well suited as power sources intended to provide a largely constant current of the kind required for operating a high-frequency generator of a corona ignition device.

Another advantageous refinement of this disclosure provides that a respective bridge circuit with at least four transistor switches be arranged between the input and primary side of the converters. Depending on the switching state of these transistor switches, the input voltage, e.g., the on-board electrical system voltage of a vehicle, can be applied to the converters with an alternating amplitude. In other words, then, the direction of a current flowing through the primary side of the transformer of one of the converters can be reversed. In contrast to a simple pulse width modulation of the primary voltage by means of a mere activation and deactivation, a higher level of power can in this way be drawn from the converter.

Another advantageous refinement of this disclosure provides that a storage capacitor be connected in parallel with the load connected to the output of the supply circuit, for example a high-frequency generator. Voltage fluctuations can be balanced out in this way, so that the corona ignition system can utilize a uniform electrical power for corona ignitions even given fluctuating on-board electrical system voltages.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
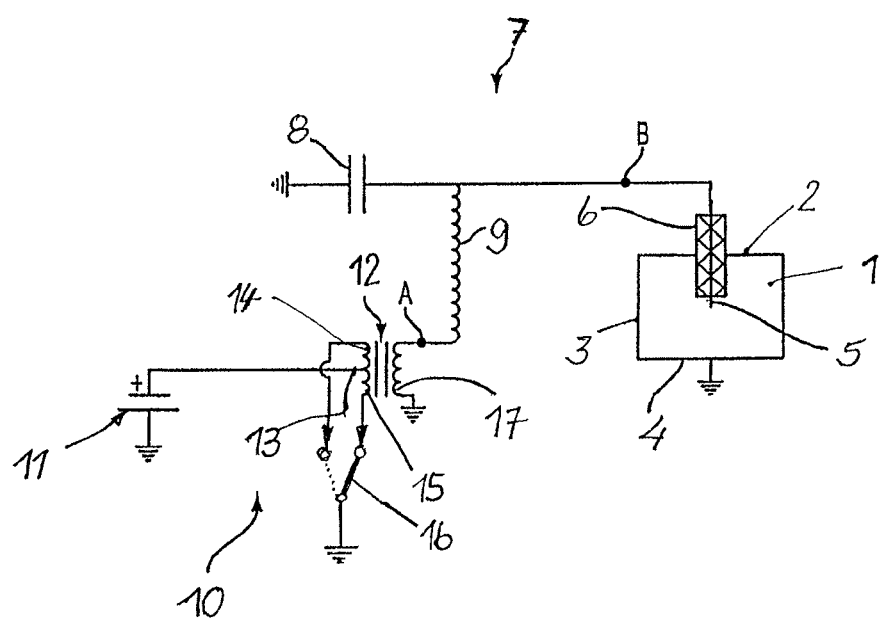
FIG. 1 is a sketch of a corona ignition system.

FIG. 1 shows a combustion chamber 1 defined by walls 2, 3 and 4, which are grounded. A corona ignition device with an ignition tip 5 projects into the combustion chamber 1 from above. The ignition tip 5 is located at the end of a center electrode, which is enveloped over at least a portion of its length by an insulator 6, by means of which it is electrically insulated and guided through the upper wall 2 and into the combustion chamber 1. The center electrode and the walls 2 to 4 of the combustion chamber 1 are part of a series resonant circuit 7, which further comprises a capacitance 8 and an inductance 9. Of course, the series resonant circuit 7 can exhibit additional inductors and/or capacitors and other components known to the expert as possible parts of series circuits.

For exciting the resonant circuit 7 a high-frequency generator 10 is provided, which is fed from a power source 11 and, for example, comprises a transformer 12 with a center tap 13 on its primary side, wherein two primary windings 14 and 15 converge on the center tap 13. A high-frequency changeover switch 16 is used to alternatingly ground the ends of the primary windings 14 and 15 remote from the center tap 1. The switching frequency of the high-frequency changeover switch 16 determines the frequency with which the series resonant circuit 7 is excited, and is variable. The secondary winding 17 of the transformer 12 feeds the series resonant circuit 7 at point A. The high-frequency changeover switch 16 is controlled by means of a control circuit (not shown) in such a way as to excite the resonant circuit with its resonance frequency. The voltage between the tip of the ignition electrode 5 and the grounded walls 2 to 4 is then at its maximum and a corona discharge forms at the ignition tip 5.

The power source 11 provides a supply voltage ranging from 100 V to 500 V, from which the high-frequency generator 10 generates a voltage of 10 kV or more. The power source 11 is a supply circuit, which is depicted on FIG. 2 and generates the supply voltage from an input voltage, for example the on-board electrical system voltage of a vehicle.

Figure 2:
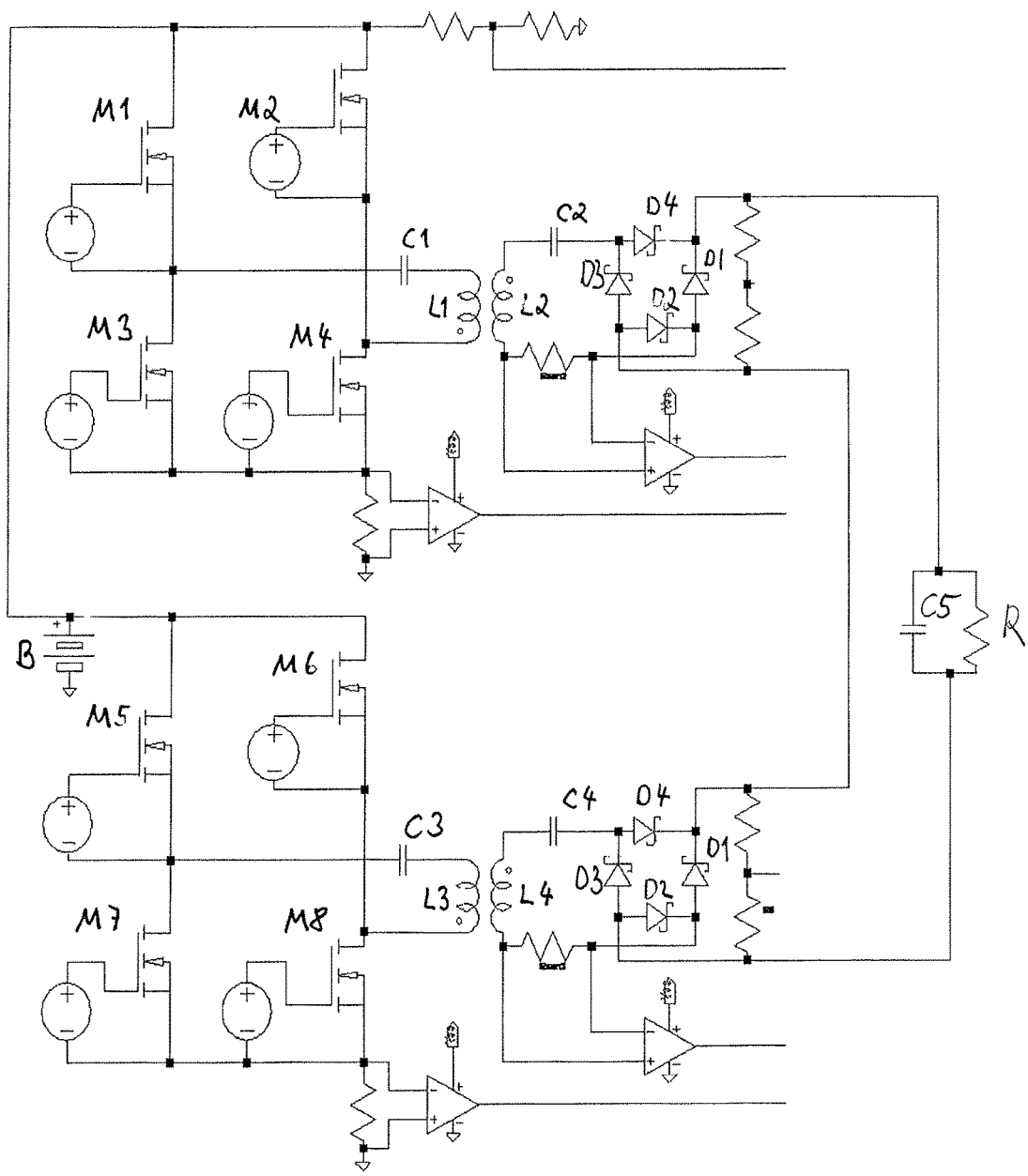
FIG. 2 is a sketch of a supply circuit of a corona ignition system.

The supply circuit shown on FIG. 2 exhibits two resonant converters. The first resonant converter is essentially comprised of the transformer with coils L1 and L2 along with the capacitors C1 and C2, and the second resonant circuit of the transformer with coils L3 and L4 along with the capacitors C3 and C4. The primary sides of the two converters, i.e., the coils L1 and L3, are connected in parallel to each other, and each connected by means of a bridge circuit having four transistor switches M1, M2, M3, M4 or M5, M6, M7, M8 to an input terminal of the supply circuit, to which an input voltage is applied, for example delivered by the electrical system of a vehicle, such as a vehicle battery B.

The switching state of the transistor switches M1-M4 or M5-M8 can be used to apply the pulse width-modulated on-board electrical system voltage, which as a rule only measures 25 V or less, to the primary sides of the converters, i.e., coils L1 and L3, with an alternating polarity. In order to reduce the load placed on the electrical system, for example when the latter is loaded by other consumers, the bridge circuits can also be operated as half bridges, thus allowing a response to changes in input voltage, and only applying a pulse width-modulated voltage to the primary sides of the converters.

A respective rectifier, for example a bridge rectifier, is connected to the secondary side of the two converters. The rectifiers can each consist of four diodes D1, D2, D3, D4 or D5, D6, D7, D8.

The secondary sides of the two converters are connected in series, and provide the output voltage of the supply circuit of a load R, specifically the high-frequency generator 10 depicted on FIG. 1. A storage capacitor C5 can here be connected in parallel with the load R, i.e., the output terminal of the supply circuit.

If one of the two converters fails while connecting the secondary sides of the two converters in series, this does not mean that power can no longer be supplied to the load R in the circuit shown on FIG. 2. This is because the secondary sides of the converters are bridged by diodes. Should one converter fail, the current supplied by the other converter can thus continue to flow through the bridging diode or diodes to the load R. In the embodiment shown in FIG. 2, the two converters are each bridged by the diodes D1, D2, D3, D4 or D5, D6, D7, D8 of the rectifiers. However, diodes not comprising part of the rectifiers can also be used to bridge the two converters by connecting at least one diode in parallel to the secondary side of each of the two converters.

Figure 3:
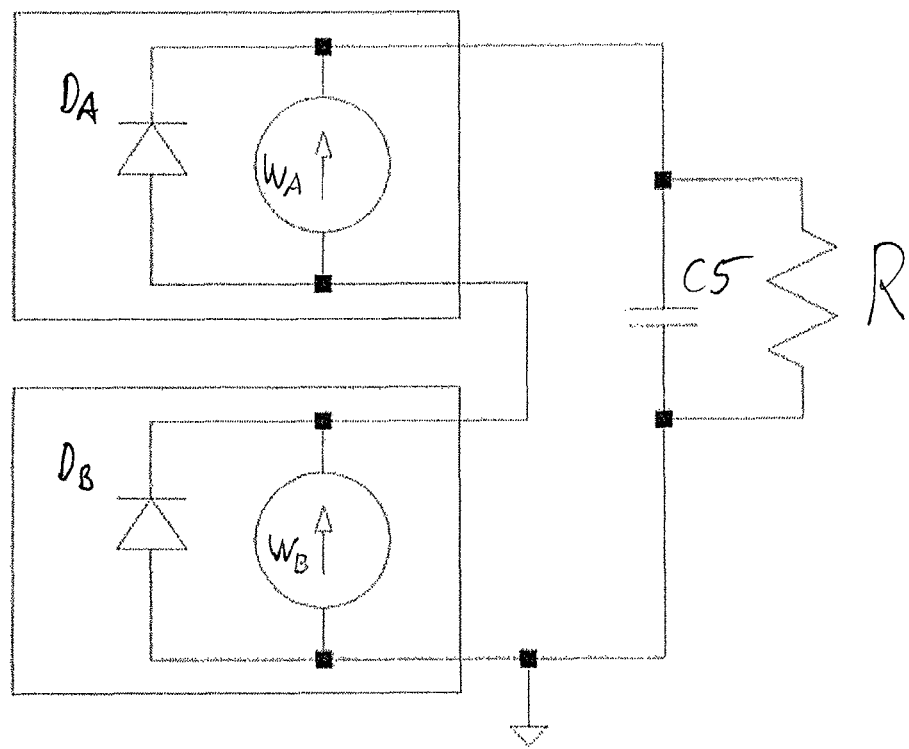
FIG. 3 is another sketch of a corona ignition system.

FIG. 3 schematically illustrates how the secondary sides of the two converters WA, WB are connected in series as power sources, and each bridged by a diode DA, DB connected in parallel.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A supply circuit for a corona ignition device, comprising:
    an input terminal configured for connection to a direct voltage source;
    a first converter;
    a second converter; and
    an output terminal configured for connecting a load;
    wherein:
        (i) the two converters each generate an output voltage, which is provided on its secondary side and exceeds the input voltage, from a respective input voltage applied to its primary side;
        (ii) the two converters each comprise a transformer that galvanically separates the primary side of the converter from its secondary side;
        (iii) at least one transistor switch is arranged between the input terminal and the primary side of the two converters for pulse width-modulation of the input voltage;
        (iv) the primary side of the second converter is connected in parallel with the primary side of the first converter;
        (v) the secondary side of the second converter is connected in series with the secondary side of the first converter; and
        (vi) the secondary sides of the two converters are each bridged in this series connection by at least one diode, so that an output voltage can be provided at the output terminal of the supply circuit even in case of a failure of one of the two converters; and
    wherein a respective bridge circuit with at least four transistor switches is situated between the input terminal and the primary side of the converters, thereby allowing a response to changes in the input voltage.

2. The supply circuit according to claim 1, wherein a storage capacitor is connected in parallel with the output terminal to compensate for voltage fluctuations.

3. The supply circuit according to claim 1, wherein the converters are resonant converters.

4. The supply circuit according to claim 1, wherein a respective rectifier is connected to the secondary side of the converters.

5. The supply circuit according to claim 4, wherein the rectifiers are bridge rectifiers.

6. A supply circuit for a corona ignition device, comprising:
   an input terminal configured for connection to a direct voltage source;
   a first converter;
   a second converter; and
   an output terminal configured for connecting a load;
   wherein:
      (i) the two converters each generate an output voltage, which is provided on its secondary side and exceeds the input voltage, from a respective input voltage applied to its primary side;
      (ii) the two converters each comprise a transformer that galvanically separates the primary side of the converter from its secondary side;
      (iii) at least one transistor switch is arranged between the input terminal and the primary side of the two converters for pulse width-modulation of the input voltage;
      (iv) the primary side of the second converter is connected in parallel with the primary side of the first converter;
      (v) the secondary side of the second converter is connected in series with the secondary side of the first converter; and
      (vi) the secondary sides of the two converters are each bridged in this series connection by at least one diode, so that an output voltage can be provided at the output terminal of the supply circuit even in case of a failure of one of the two converters; and
   wherein the converters are configured to deliver the output voltage at a magnitude of 100 V to 500 V.

7. The supply circuit according to claim 6, wherein the converters are designed to generate the output voltage from the input voltage of less than 50 V.

8. A supply circuit for a corona ignition device, comprising:
   an input terminal configured for connection to a direct voltage source;
   a first converter;
   a second converter; and
   an output terminal configured for connecting a load;
   wherein:
      (i) the two converters each generate an output voltage, which is provided on its secondary side and exceeds the input voltage, from a respective input voltage applied to its primary side;
      (ii) the two converters each comprise a transformer that galvanically separates the primary side of the converter from its secondary side;
      (iii) at least one transistor switch is arranged between the input terminal and the primary side of the two converters for pulse width-modulation of the input voltage;
      (iv) the primary side of the second converter is connected in parallel with the primary side of the first converter;
      (v) the secondary side of the second converter is connected in series with the secondary side of the first converter; and
      (vi) the secondary sides of the two converters are each bridged in this series connection by at least one diode, so that an output voltage can be provided at the output terminal of the supply circuit even in case of a failure of one of the two converters; and
   wherein the load connected to the output is a high-frequency generator, which generates a high-frequency alternating voltage of 10 kV or more from the output voltage of the supply circuit.

9. A corona ignition system comprising a supply circuit according to claim 8 and a corona ignition device that comprises an electrical resonant circuit with a coil, and a center electrode that is held in an insulator and ends in an ignition tip, wherein the resonant circuit is excited by the high-frequency generator.

10. The supply circuit according to claim 9, wherein a respective bridge circuit with at least four transistor switches is situated between the input terminal and the primary side of the converters, thereby allowing a response to changes in the input voltage.

\* \* \* \* \*